United States Patent [19]
Zuckerwar et al.

[11] 4,149,423
[45] Apr. 17, 1979

[54] HIGH-TEMPERATURE MICROPHONE SYSTEM

[76] Inventors: Robert A. Frosch, Administrator of the National Aeronautics and Space Administration with respect to an invention of Allan J. Zuckerwar, Newport News, Va.

[21] Appl. No.: 900,842

[22] Filed: Apr. 28, 1978

[51] Int. Cl.² .................... G01L 9/12; G01L 11/00
[52] U.S. Cl. ................................. 73/724; 73/647
[58] Field of Search ............... 73/647, 648, 708, 718, 73/724, 339 A; 332/2

[56] References Cited
U.S. PATENT DOCUMENTS

| | | | |
|---|---|---|---|
| 3,868,856 | 3/1975 | Fletcher | 73/647 |
| 3,948,102 | 4/1976 | Coon | 73/724 |
| 3,964,319 | 6/1976 | Fletcher | 73/647 |

*Primary Examiner*—Charles A. Ruehl
*Attorney, Agent, or Firm*—William H. King; John R. Manning; Howard J. Osborn

[57] ABSTRACT

Apparatus for measuring pressure fluctuations in air or other gases in an area of elevated temperature. A condenser microphone is located in the area of elevated temperature and electronics for processing changes in the microphone capacitance is located outside the area and connected to the microphone by means of a high-temperature cable assembly. The microphone includes apparatus for decreasing the undesirable change in microphone sensitivity at high temperatures. The high-temperature cable assembly operates as a half-wavelength transmission line in an AM carrier system and maintains a large temperature gradient between the two ends of the cable assembly. The processing electronics utilizes a voltage controlled oscillator for automatic tuning thereby increasing the sensitivity of the measuring apparatus.

8 Claims, 7 Drawing Figures

HIGH-TEMPERATURE MICROPHONE SYSTEM

ORIGIN OF THE INVENTION

The invention described herein was made in the performance of work under a NASA contract and is subject to the provisions of section 305 of the National Aeronautics and Space Act of 1958, Public Law 85–568 (72 Stat. 435; 42 USC 2457).

BACKGROUND OF THE INVENTION

The invention relates generally to apparatus for measuring pressure and more specifically concerns apparatus for measuring pressure fluctuations in air or other gases in areas of elevated temperature.

The prior art for measuring pressure in high temperature environments includes semiconductor pressure transducers, eddy-current transducers, the probe microphone in which a conventional microphone is situated at the end of a rigid-walled tube functioning as an acoustic transmission line, and water-cooled conventional transducers.

The disadvantages of the prior art are: The semiconductor pressure transducer has a maximum rating of 260° C., a limitation inherent in the nature of the transducer. The eddy-current transducer was developed for use at a much higher temperature than the present invention and as a result its fabrication involves costly specialized materials and processing. It has an inferior frequency response and it has a high noise floor. The probe microphone, in order to maintain a flat frequency response, requires a sound-absorbing material at the tip of the probe, which is subject to deterioration under a hostile environment. In many cases, limited space prohibits mounting of the relatively long probe tube assembly. Furthermore, because of prominent wave interference phenomena in the probe tube, the calibration constant must be known at each measured frequency. The water-cooling of conventional transducers is impractical or ineffective in many cases.

It is therefore the primary purpose of this invention to provide apparatus for measuring pressure fluctuations in air or other gases in a high-temperature environment that does not have the disadvantages of prior art devices for performing the same function.

SUMMARY OF THE INVENTION

A condenser microphone is located in a high temperature area where pressure measurements are to be made. The backplate material of the microphone differs from that of the microphone case and is chosen to minimize the temperature coefficient of the membrane-backplate gap. A carrier electronics unit is located outside the high temperature area and is connected to the microphone by means of a high-temperature cable assembly. The cable assembly is designed to sustain a large temperature gradient between the microphone and the carrier electronics and is designed to operate as a half-wavelength transmission line in an AM carrier system. The carrier electronics is the means for converting changes in capacitance of the microphone, due to changes in pressure, into electrical signals. This carrier electronics includes a voltage controlled oscillator that is used for automatic tuning control and electrical calibration, permitting control without the addition of capacitors in parallel with the microphone, which reduced sensitivity.

DETAILED DESCRIPTION OF THE INVENTION

Figure 1:
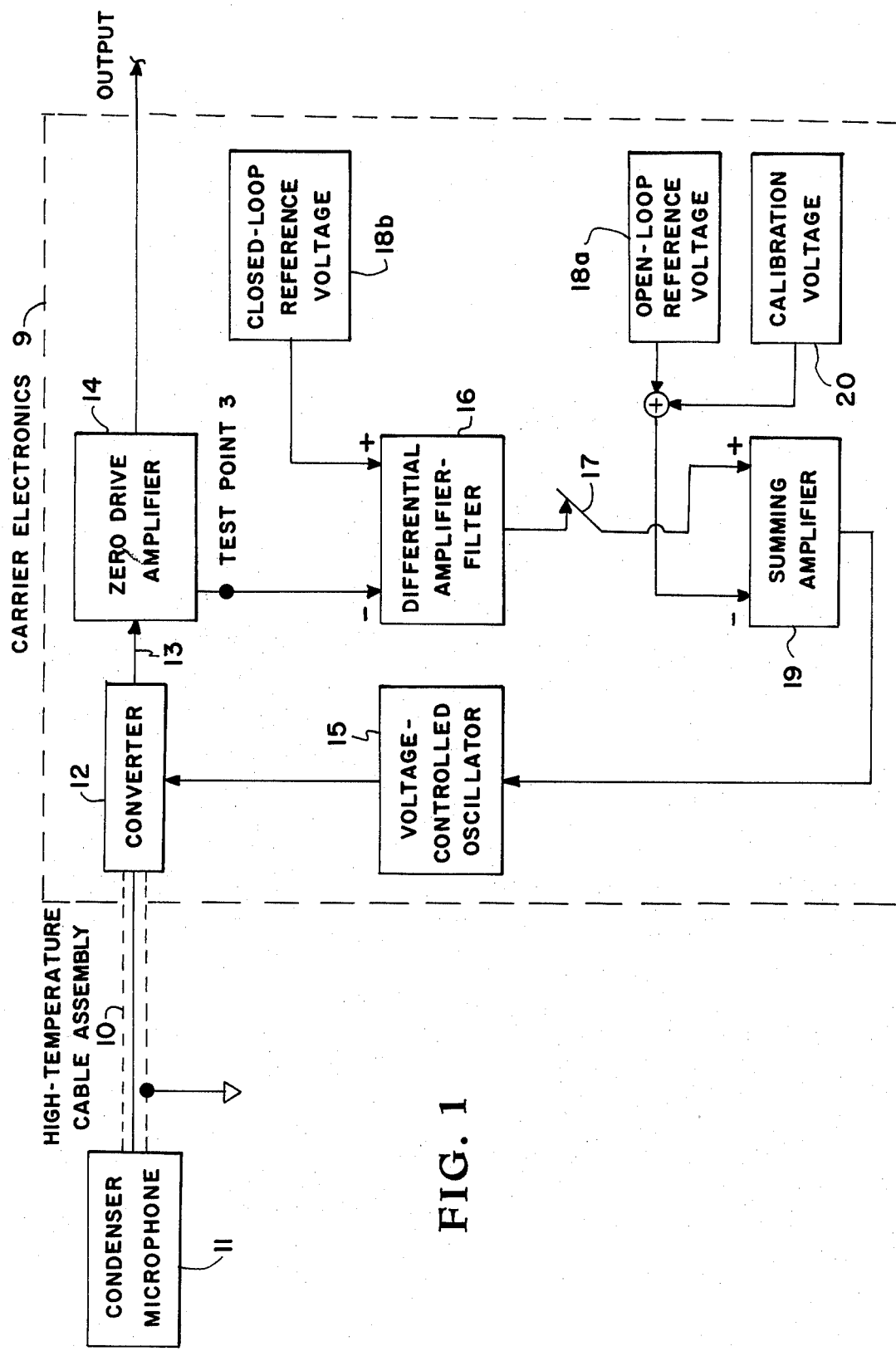
FIG. 1 is a block diagram of the invention.

Turning now to the embodiment of the invention selected for illustration in the drawings, the block diagram in FIG. 1 shows a high-temperature microphone system, which consists of three basic components: a condenser microphone 11, a high-temperature cable assembly 10, and carrier electronics 9. The carrier electronics unit is a modified form of the converted zero drive amplifier system described in U.S. Pat. No. 3,868,856 and of the automatic tuning control system described in U.S. Pat. No. 3,964,319. Sound pressure fluctuations produce capacitance changes in the condenser microphone 11, which amplitude-modulate a carrier wave transmitted over the high-temperature cable assembly 10. The high-temperature cable assembly, typically 6 m (20 ft) in length, operates as a half-wavelength transmission line, which effectively reflects the condenser microphone to the input terminals of a converter 12 included with carrier electronics 9 and permits removal of the carrier electronics from the severe operational environment of the condenser microphone. The converter detects the acoustical signal and produces an electric current proportional to the sound pressure at the condenser microphone. The electric current is amplified by a zero drive amplifier 14, whose output signal is applied to a measuring, data processing, or recording device. An automatic tuning control feedback loop, consisting of a differential amplifier-filter 16, a closed-loop reference voltage 18b, an open-loop reference voltage 18a, and a summing amplifier 19, maintains optimum tuning of the carrier voltage, which is provided by a voltage-controlled oscillator (VCO) 15, to one of the resonant frequencies of the cable-microphone network. The system allows for electrical calibration by means of a calibration voltage 20 applied to an input of the summing amplifier 19.

The major changes in the carrier electronics disclosed in the two abovementioned patents necessitated by present requirements may be summarized as follows: first, all components are in close physical proximity to one another; the length of the cable 13, connecting the converter 12 to the zero drive amplifier 14, is reduced from up to 1000 m to less than 0.3 m. Secondly, the input network of the converter 12 is modified to accommodate the high-temperature cable assembly 10. Thirdly, the internal local oscillator of the converter 12 is replaced by the VCO 15 to extend the range of automatic tuning control. Fourthly, the output signal of the differential amplifier-filter 16 is connected to the noninverting input, instead of the inverting input, of the summing amplifier 19 to satisfy the control requirements of the VCO 15. Finally, the response time of the differential amplifier-filter 16 is reduced to approximately 0.1 sec to permit the automatic tuning control system to follow the anticipated more rapid changes in static capacitance of the condenser microphone.

Figure 2:
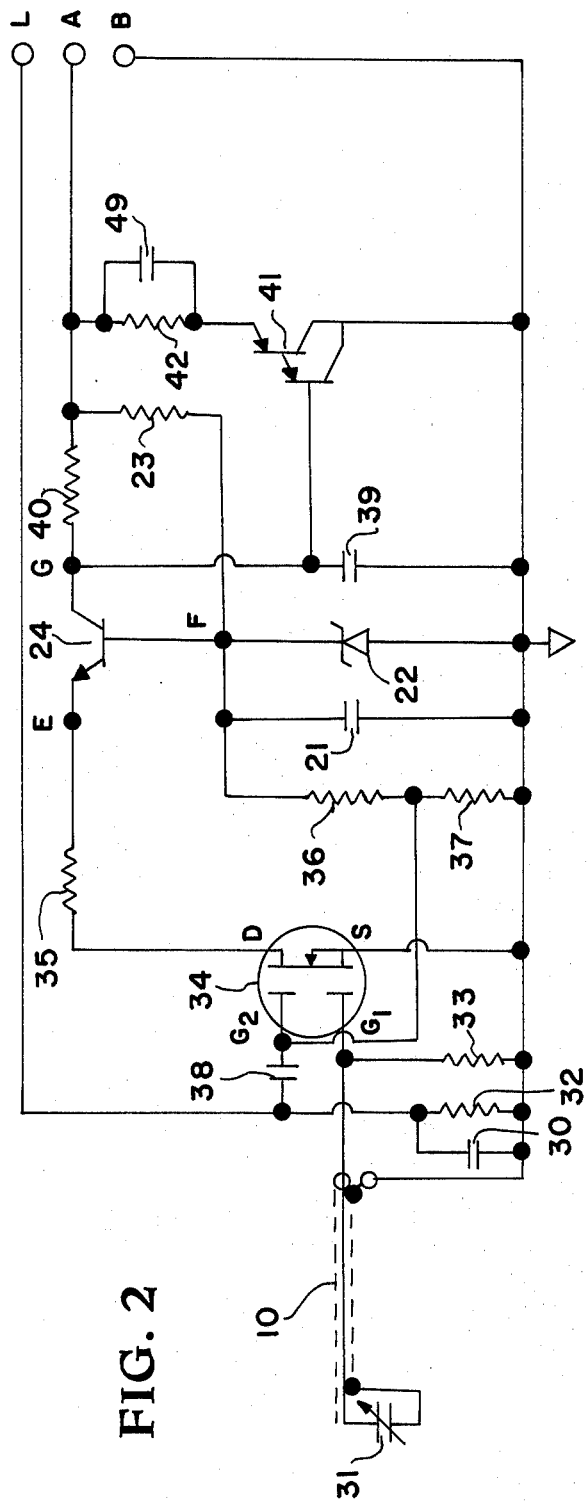
FIG. 2 is a circuit diagram of the converter shown in FIG. 1.

The converter 12 consists of two parts, an FET mixer and a voltage regulator/impedance translator, shown in the circuit diagram of FIG. 2. The FET mixer part of converter 12 consists of capacitors 30 and 38, a dual-gate FET 34, and resistors 32, 33, 35, 36, and 37. The sending end of high-temperature cable assembly 10 is connected between gate $G_1$ of FET 34 and a terminal B, in parallel with resistor 33; the receiving end is connected to the condenser microphone, represented as a variable capacitor 31. The drain electrode D of FET 34 is connected through resistor 35 to a point E; the source electrode S is connected to terminal B, and gate $G_2$ is connected to the junction of resistors 36, 37, and capacitor 38. Capacitor 30 and resistor 32 are connected in parallel between a point L, to which the other side of capacitor 38 is also connected, and terminal B. Resistor 33 prevents static charge from accumulating on gate $G_1$. Capacitor 30 and resistor 32 provide a suitable load impedance to the VCO 15, connected at point L. Capacitor 38 couples the carrier voltage at the output of the VCO to gate $G_2$ of the FET and blocks the d.c. at point L. Resistors 36 and 37 form a voltage-divider network to bias gate $G_2$ of the FET at +2 V d.c., upon which the 4 V peak-to-peak carrier is superimposed. Consequently, in the course of a carrier cycle, the gate $G_1$ transconductance, defined as the change in drain current per unit in gate $G_1$ voltage, varies typically from 1 to 12.5 mmho; such a strong dependence of the gate $G_1$ transconductance upon the gate $G_2$ voltage is characteristic of the dual-gate FET. Now cable 10 and capacitor 31 comprise a resonant circuit connected between gate $G_1$ and source (ground), to which the frequency of the VCO is tuned. Resistor 35, the load resistor of the drain circuit, is chosen for optimal linear operation of the FET.

The carrier voltage at gate $G_2$ generates a component of drain current at the carrier frequency. As a result of drain-to-gate capacitive coupling, a small fraction of the drain current leaks into the gate $G_1$ circuit and produces a voltage at gate $G_1$. The strong dependence of the gate $G_1$ transconductance upon the gate $G_2$ voltage causes the signal at gate $G_1$ to mix with that at gate $G_2$ and to generate a direct drain current component over and beyond the quiescent current. A change in capacitance 31 changes the level of this current; consequently, a periodic change in capacitance 31, as caused by the presence of sound at the microphone, produces a periodic FET drain current at the frequency of the sound. This component of the FET drain current will be called the "audio" current, even though in principle the frequency of such a current may extend from d.c. to several hundred kHz. The drain-to-gate capacitive coupling is an unwanted effect in a conventional mixer circuit, but here the effect is used to advantage and renders possible the detection of very small changes in capacitance 31.

The voltage regulator part of converter 12 consists of a capacitor 21, a zener diode 22, and a ballast resistor 23. The zero drive amplifier 14 maintains a constant 22 V d.c. across terminals A-B and serves as the source of power for the converter. Capacitor 21 and zener diode 22 are connected between terminal B (ground) and point F, and resistor 23 is connected between point F and terminal A. Across the ballast resistor 23, the voltage drops from 22 V at terminal A to 10 V at point F. The latter voltage is just equal to the zener voltage of zener diode 22. Because of the small base-emitter voltage drop of a transistor 24, this is for all practical purposes the power supply voltage at point E for the mixer stage. Capacitor 21 enables currents at the carrier frequency to bypass the zener diode 22, and point E may be considered at ground potential as far as carrier currents are concerned.

The impedance translator part of converter 12 consists of transistor 24, capacitors 39 and 49, resistors 40 and 42, and a Darlington transistor 41. Transistor 24 and resistor 40 are connected in series between terminal A and point E with the base of transistor 24 connected to point F. Darlington transistor 41 and resistor 42 are connected in series between terminals A and B. Capacitor 49 is connected across resistor 42 to extend the bandwidth of the converter by increasing the gain of the impedance translator preferentially for higher acoustical frequencies. The collector of transistor 24, point G, is connected to the base of transistor 41 and through capacitor 39 to terminal B. The carrier and audio components of FET drain current pass through the base-emitter terminals of transistor 24, causing sympathetic variations in the collector voltage at point G. The capacitance 39 is of such a magnitude as to short-circuit currents at the carrier frequency, but not those at audio frequencies. Capacitor 39 nominally maintains a voltage of 15 V d.c. at point G; this voltage rises and drops concomitantly with rises and drops in the audio component of the FET drain current. Now the current entering point A from the zero-drive amplifier, called the "line" current, splits at the node joining resistors 23, 40, and 42, part passing through each resistor. The part passing through resistor 42 enters the emitter of Darlington transistor 41. A small fraction of the emitter current exits the base and proceeds to point G; the remainder passes on to ground through the collector. The voltage drop across resistor 40 controls the base current of transistor 41, and this in turn controls the collector current. When the voltage at G rises or drops, these two parts of the line current drop or rise proportionally. Thus, the Darlington transistor 41 acts to lower the output impedance of the converter for better matching to the extremely low input impedance of the zero drive amplifier. The filtering action of capacitor 39 greatly attenuates the carrier current reaching the zero drive amplifier, but has little effect upon the audio currents. The audio component of the line current is amplified by the zero drive amplifier 14, a model N461 manufactured by Gilmore Industries, Inc., Cleveland, Ohio.

The converter-zero drive system has two modes of operation, depending upon whether or not automatic tuning is connected into the system (see FIG. 1). In the "open-loop" mode the differential amplifier-filter 16 is disconnected from the system by means of a switch 17. Tuning of the converter is accomplished through adjustment of an open-loop reference voltage 18a, which controls the frequency of the VCO 15. The system is switched, by means of switch 17, to the "closed-loop" mode for the purpose of maintaining a fixed converter tuning point. The direct component of the converter output voltage is highly sensitive to deviations from optimal tuning. These deviations are consequently reflected not in the voltage at the output of the zero drive amplifier circuit 14, but rather in a voltage proportional to the output of the converter located at an internal point, designated as "test point 3" in the zero drive amplifier circuit 14. The difference between the test-point 3 voltage and a closed-loop reference voltage 18b, applied to the inverting and noninverting inputs of the differential amplifier-filter 16 respectively, provides a voltage at the output of the differential amplifier-filter, henceforth to be called the "error voltage." The output of a summing amplifier 19 is proportional to the difference between the error voltage and the open-loop reference voltage 18a, which together control the frequency of the VCO 15.

The feedback loop is intended to pass only the relatively slowly varying signals associated with the environmental effects upon the microphone capacitance. If signals at the acoustical frequencies were permitted to pass through the feedback loop, they would cause variations in the VCO frequency which would cancel the capacitance variations of the microphone. In order to avoid cancellation of the acoustical signals, low-pass filtering is built into the differential amplifier 16. Signals at the relatively high acoustical frequencies are blocked, but those at low frequencies associated with the automatic control of the converter tuning point are permitted to complete the control loop.

In order to calibrate the system an a.c. electrical signal from a calibration source 20 is applied to the inverting input of summing amplifier 19. The variations in VCO frequency caused by the calibration signal produce variations in output voltage similar to those produced by acoustical excitation of the microphone 11.

Figure 3:
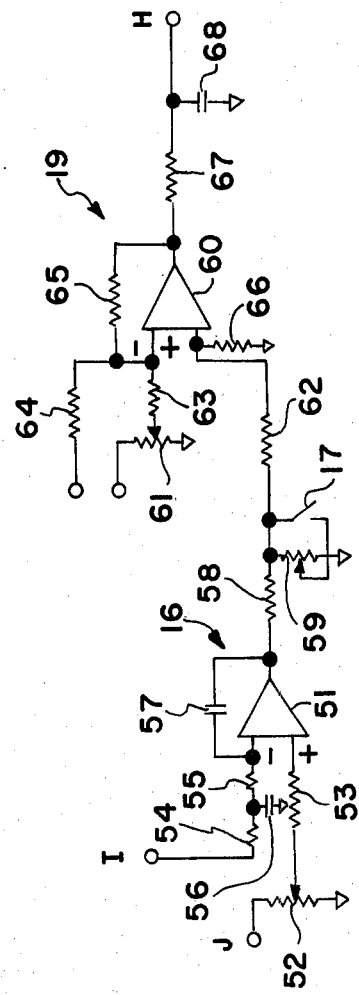
FIG. 3 is a circuit diagram of the differential amplifier and summing amplifier in FIG. 1.

FIG. 3 shows a circuit diagram of the differential amplifier-filter 16 and summing amplifier 19. The active element of the differential amplifier-filter is an integrated circuit FET input operational amplifier 51. Terminal I is connected to "test point 3" of the zero drive amplifier 14, at which point the voltage is dependent upon the quiescent condition of the converter. In the absence of sound at the microphone the voltage at terminal I varies proportionally with deviations from the optimal converter tuning point. The voltage at the inverting input of operational amplifier 51 is proportional to that at terminal I. Terminal J is connected to closed-loop reference voltage 18b; a fraction of this voltage appears at the noninverting input of amplifier 51, depending upon the adjustment of a rheostat 52. The voltage at the noninverting terminal of amplifier 51 is the "closed-loop reference voltage." In the closed-loop mode of operation the feedback control system continuously strives to make the voltage at the inverting terminal of amplifier 51 equal to that at the noninverting terminal. The combination of resistors 54 and 55 and capacitors 56 and 57 provides two-pole, low-pass filtering, which blocks signals at the acoustical frequencies, but passes the slowly varying signals associated with automatic tuning. Resistor 53 is used to balance out the differential offset current. Resistor 58 in combination with rheostat 59 forms a voltage divider, used to control the error voltage at the output terminal of the differential amplifier filter 16. By means of rheostat 59 the closed-loop gain of the system is adjusted; the gain must be sufficiently high for good regulation, yet low enough to prevent the onset of unstable oscillations in the feedback loop. The specifications of the low-pass filter are such as to require high values of resistance for resistors 54 and 55; this requirement necessitates that the operational amplifier 51 be of the FET type because of its extremely high input resistance.

Switch 17 is used to switch the system between the open-loop and closed-loop modes of operation. The closed position of the switch corresponds to the open-loop mode, for the error voltage is short-circuited and does not appear at the input of the summing amplifier 19.

The active element of the summing amplifier 19 is a monolithic operational amplifier 60. The summing point is located at the inverting input terminal, to which are applied the open-loop reference voltage 18a, as adjusted by means of rheostat 61, and the external calibration voltage 20 through resistor 64. The error voltage, however, is applied to the noninverting input terminal because of the direction in which the VCO frequency changes with control voltage. In the VCO selected for illustration, a Hope Electronics Model VCO-100A, the frequency increases with increasing control voltage. For this reason operational amplifier 60, in its control function, operates in the differential mode, but the term "summing amplifier" is retained for consistency with previous usage. If a VCO were employed whereby the frequency decreases with increasing control voltage, then the error voltage would be applied to the inverting input, and operational amplifier 60 would operate as a true summing amplifier. Resistors 62 and 66, connected in series between the source of the error voltage and ground, form a voltage divider network; at their intersection a fraction of the error voltage is applied to the noninverting input of the operational amplifier. In the open-loop mode of operation resistors 62 and 66 provide a parallel path from the noninverting input terminal to ground and balance out the differential offset current. Resistors 63 and 64 determine the currents entering the summing point from the calibration and open-loop reference voltage sources. Resistor 65, a feedback resistor connected between the output terminal and the inverting input of the operational amplifier, determines the gain of amplifier stage. Resistor 67 and capacitor 68 form a low-pass filter to suppress high-frequency noise generated in the automatic tuning control loop. The automatic tuning control voltage appears at point H, the intersection of resistor 67 and capacitor 68, and is applied directly to the VCO input terminal.

For the purpose of tuning the converter the system is excited either by means of acoustical excitation of the microphone or by means of a calibration voltage 20 at an audio frequency. The tuning procedure consists of two steps. First, switch 17 is thrown to the "open-loop" position and rheostat 61 is adjusted for optimal tuning. Then switch 17 is thrown to the "closed-loop" position and rheostat 52 is similarly adjusted for optimal tuning, under which condition the voltages at the two terminals of operational amplifier 51 match. A subsequent change in microphone capacitance, as may be caused by a variation in ambient temperature, will detune the converter, change the voltage at terminal I, and drive the control system until the voltages at the two terminals of operational amplifier 51 again match.

Circuit elements in the converter of FIG. 2 can have the same values as those given for the corresponding elements in U.S. Pat. No. 3,868,856 except for the following modifications: resistors 32, 33, and 36, 47 Ω, 100 kΩ, and 6.8 MΩ respectively; capacitors 30, 38, and 49, 100 pf, 470 pf, and 0.02 μf respectively; FET 34, 3N212. The converter elements may be housed in a conventional electronic chassis. Circuit elements in the feedback branch of FIG. 3 can have the same values as those given in U.S. Pat. No. 3,964,319 except for the following modifications: resistors 54, 55, and 66, 100 kΩ, 100 kΩ, and 10 kΩ respectively; capacitor 68, 2.5 μf. The feedback branch elements may be located within the chassis of the N461 zero drive amplifier, and the sources for the positive closed-loop reference voltage 18b and the negative open-loop reference voltage 18a may be taken from an existing power supply within the zero drive amplifier.

Figure 4:
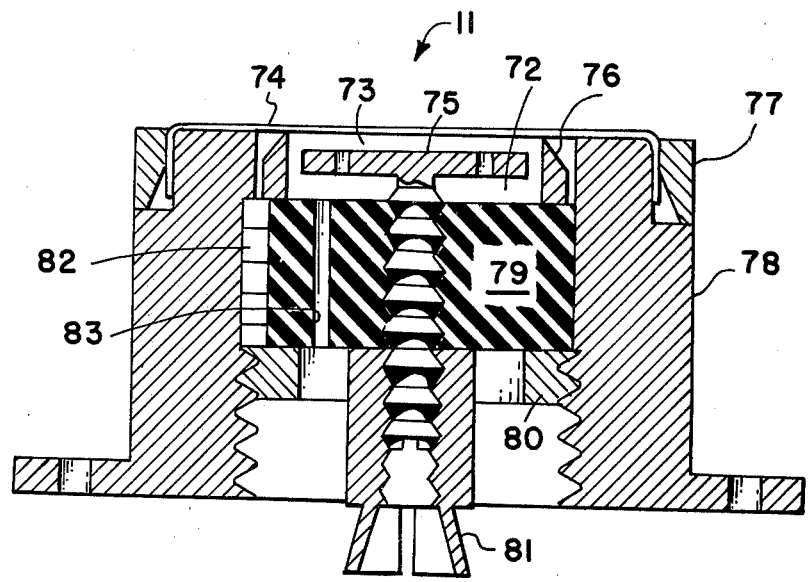
FIG. 4 is a cross section of the condenser microphone.

FIG. 4 shows a cross section of the condenser microphone cartridge 11. Details of its construction are not unlike those of similar cartridges used in the past, but the choice of materials used here is more amenable to operation at high temperatures. A thin membrane 74, serving as the pressure-sensitive capacitive electrode, is stretched over the top face of the case 78 and is clamped in place by means of a membrane retaining ring 77. An insulator 79 supports the backplate 75, which serves as the fixed capacitive electrode; a threaded shaft on the backplate provides for adjustment of the gap 73 between the membrane and backplate. Several holes in the backplate, in addition to a peripheral slot, permit the flow of air between the gap and backchamber 72 to reduce the membrane damping. A threaded ring 80 controls the vertical position of the insulator 79 and a tension ring 76, and thus provides the means of adjusting the tension in the membrane. A second identical threaded ring may be used to lock the first in place. The insulator contains a slot for a key 82 to prevent rotation. The locking tube 81 holds the backplate 75 firmly in place and mates with a cable connector 91, shown in FIG. 5. A flange on the bottom of the case contains several screw holes for attachment to the cable connector and for mounting on a support panel. A capillary hole 83 through the insulator 79 permits equalization of the static air pressure in the gap 73, backchamber 72, and ambient atmosphere.

If the backplate 75 is made of the same material as the case 78, the gap 73 tends to close with increasing temperature—an event which causes an undesirable increase in microphone sensitivity. As a remedial measure the backplate is made of a material having a lower thermal expansion coefficient than that of the case; for example, the backplate may be made of type 17-4 PH stainless steel and the case of type 304 stainless steel, for which the thermal expansion coefficients are in the approximate ratio 2:3, respectively. A suitable material for the insulator 79 is macor (TM Corning Glass Works), a machinable glass ceramic whose thermal expansion coefficient closely matches that of type 17-4 PH stainless steel; and for the remaining parts, 74, 76, 77, 78, 80, 81, and 82, type 304 stainless steel.

Typical dimensions of the microphone cartridge components are inner diameter of tension ring 76, 9.525 mm; membrane 74 thickness, 5.558 μm; gap 73 width, 40 μm; capillary hole 83 diameter, 0.508 mm; backplate 75 outer diameter, 9.144 mm, thickness 0.660 mm, number of holes, 4, hole centerline diameter, 5.385 mm, and hole diameter, 0.794 mm. The remaining dimensions are not critical to the microphone performance. A microphone having the above materials and dimensions, and sufficient membrane tension, will operate over a range of frequencies from 2 Hz to 10 kHz, of sound pressure amplitudes from 110 to 180 dB (re: $2 \times 10^{-5}$ N/m$^2$), and of temperatures from 20° to 470° C. or beyond.

Figure 5:
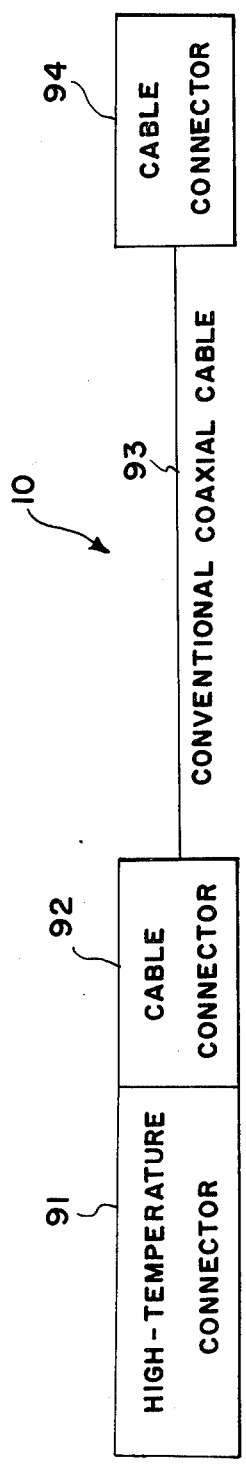
FIG. 5 is a block diagram of the high-temperature cable assembly.
Figure 6:
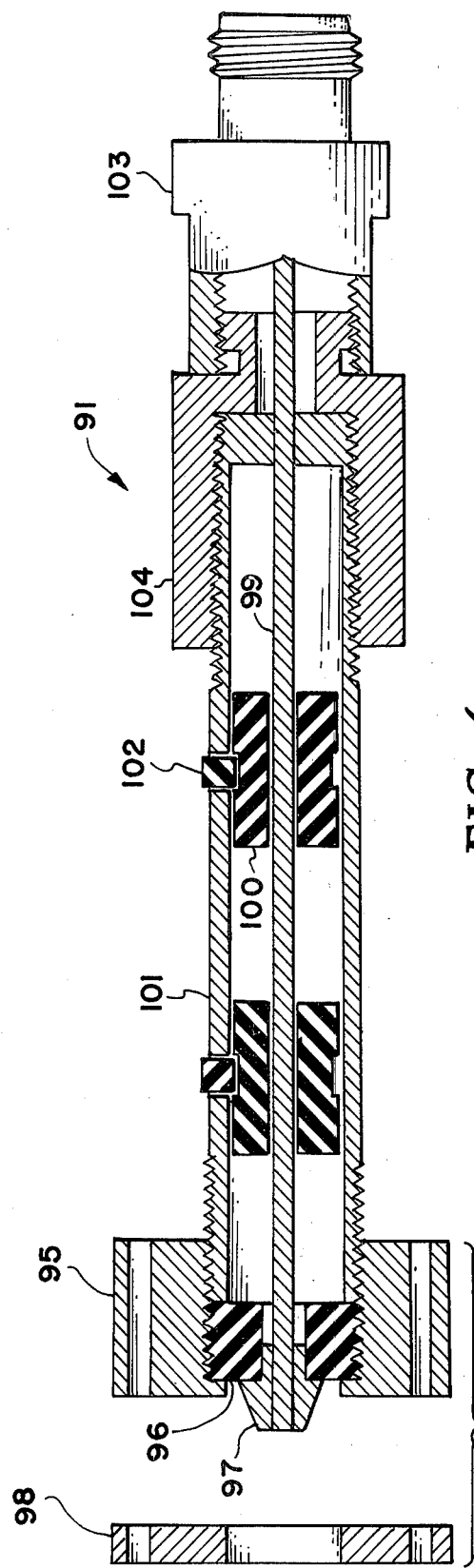
FIG. 6 is a cross section of the high temperature connector included with the high-temperature cable assembly.

The high-temperature cable assembly 10 consists of two parts, a high-temperature connector 91 and a conventional coaxial cable 93 with standard connectors 92 and 94, as shown in FIG. 5. The high-temperature connector, shown in FIG. 6, is a short, rigid coaxial connector, designed to sustain a large temperature gradient between the hot zone of the microphone and the cool environment of the conventional coaxial cable. Case 95, insulating spacer 96, and contact pin 97 are used to attach the connector to the microphone cartridge 11. An external ring 98 is placed between case 95 and the microphone cartridge to ensure proper contact pressure. After the screw-holes of these three pieces are aligned, they are joined together by means of common screws and nuts. Contact pin 97, silver soldered to center conductor 99, engages the slotted shell of the microphone locking tube 81. Insulating spacers 100 prevent motion of the center conductor 99 with respect to tube 101, the outer conductor. Pins 102, silver soldered to tube 101, hold spacers 100 firmly in place. A hole in the tube provides pressure relief. A modified TNC straight coaxial jack 103, screwed onto the external threads of a cap 104, which in turn is screwed onto the external threads of the tube 101, connects directly to connector 92 of the conventional coaxial cable 93. The external threads of the tube 101, which engage the internal threads of the cap 104, are used to adjust the tension in the center conductor, whereafter the cap is spot soldered to the tube.

Materials for the high-temperature connector 91 may be the following: type 304 stainless steel—parts 95 and 97; macor—parts 96 and 100; copper—parts 99, 101, 102, and 104. The TNC straight coaxial jack 103 may be General Fittings Part No. 4025-005, which the internal insulators are replaced by identical macor insulators. The cable 93 may be type RG 11A/U terminated by two connectors 92 and 94, each of which may be a type "N" cable plug screwed into a TNC plug/N jack adaptor, for example, Amphenol Part Nos. 82-312 and 79-825 respectively.

A typical size of center conductor 99 is AWG 24. Tube 101 may be copper tubing 1.27 cm O.D.×0.081 cm wall thickness×whatever length is needed to remove cable connector 92 from the hot environment of the microphone (typically 7.62 cm to 121.9 cm, with spacers 100 placed every 7.62 cm along the tube). The conventional coaxial cable 93 is typically 6 m in length, the remaining dimensions of the high-temperature cable assembly are not critical. If the lengths of the high-temperature connector 91 and the conventional coaxial cable 93 are 7.62 cm and 6 m respectively, then the resonant frequencies of the cable assembly 10 will lie at approximately 16, 32, 48 64, . . . MHz; the high-temperature microphone system is found to operate best at the third resonant frequency, approximately 48 MHz.

Figure 7:
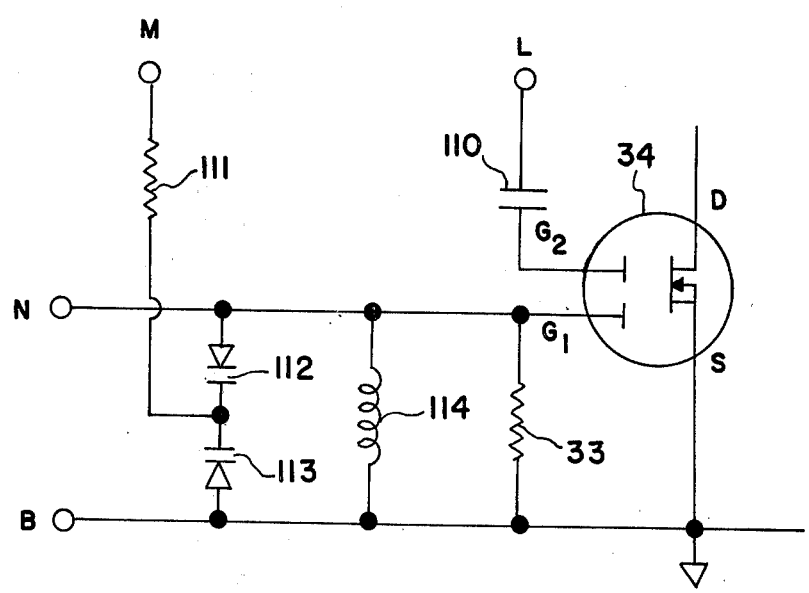
FIG. 7 is a circuit diagram of an alternate embodiment of the automatic tuning control.

An alternate embodiment of the automatic tuning control may also be achieved by the varactor diode network shown in FIG. 7 and described in U.S. Pat. No. 3,964,319. Here a local oscillator, in place of the VCO, applies the carrier voltage at a fixed frequency at terminal L, through capacitor 110 to gate $G_2$ of the FET 34. The cable 10 is connected between gate $G_1$ (terminal N) and the source S (terminal B) of the FET, in parallel with inductor 114, resistor 33, and a series arrangement of a pair of varactor diodes 112 and 113. The other end of the cable is connected to the microphone 11, as in FIG. 1. The resonant frequency of the FET mixer input network is now determined by the parallel combination of cable 10, varactor diodes 112 and 113, and inductor 114. Tuning is achieved by means of the control voltage applied to point M, which also appears at the intersection of the varactor diodes through resistor 111 and determines the capacitance of the varactor diodes. Resistor 33 provides a ground return for static charge which might otherwise accumulate on gate $G_1$. This means of automatic tuning control will also function if the inductor 114 is removed.

The high-temperature cable assembly 10 may be replaced by any cable that is of sufficiently high electrical quality and that will withstand the high-temperature environment of the condenser microphone, for example, the transmission lines containing silicon dioxide powders manufactured by Kaman Sciences Corporation. The microphone may be mounted by means other than the screw holes through the flange of case 78, shown in FIG. 4; for example, case 78 may contain external mounting threads. Other microphone materials than those suggested may be used to provide a small temperature coefficient of the gap 73. Furthermore, the microphone may be configured to sizes other than that suggested for illustration.

The advantages of this invention are: It employs a condenser microphone as the pressure transducer and inherently avails itself of all the advantages of the latter, including low noise floor, wide dynamic range, wide frequency bandwidth, high mechanical and electrical stability, and low vibration sensitivity; the condenser microphone described here is capable of operating at higher temperatures than those used in the past; all mating parts within the condenser microphone cartridge are either screwed in place or press-fit; there exists no chemical or metallurgical bonds, which are invariably subject to deterioration at elevated temperatures, as experience has shown; the smooth, planar membrane surface makes flush-mounting possible; external means of cooling is not necessary; all parts of the high-temperature microphone system are made of abundant, inexpensive, and readily available materials; exotic or highly specialized materials and fabrication processes are not needed; and the system can be calibrated by means of an electrical insertion voltage.

What is claimed is:

1. Apparatus for measuring pressure fluctuations in air or other gases in an area of elevated temperature with a sensitivity not unduly dependent upon temperature or rate of change of temperature comprising:
    a condenser microphone means in said area of elevated temperature for varying a capacitor in accordance with the pressure fluctuations on said microphone means;
    a high-temperature cable means;
    electronic means, outside said area and connected to said condenser microphone means by said high-temperature cable means, for producing an electrical current proportional to the sound pressure at said condenser microphone means;
    said high-temperature cable means including means for maintaining a large temperature gradient between the microphone and the cool environment of said electronic means;
    said electronic means comprising a voltage controlled oscillator for generating a carrier frequency; a field-effect transitor means connected to receive the outputs from said oscillator and said high-temperature cable means for producing an electrical signal containing said carrier frequency and the variations of said capacitor; means for removing said carrier frequency from said electrical signal to obtain said electrical current; and feedback means for maintaining the output of said oscillator at a frequency corresponding to one of the resonant frequencies of the microphone-cable network.

2. Apparatus according to claim 1 wherein said high-temperature cable means includes means for making it operate as a half-wavelength transmission line in an AM carrier system.

3. Apparatus according to claim 2 wherein said high-temperature cable means includes a high-temperature connector and a conventional coaxial cable with the high temperature connector connected to said condenser microphone means.

4. Apparatus according to claim 3 wherein said high-temperature connector is a rigid coaxial connector designed to sustain a large temperature gradient between the hot zone of said microphone means and the cool environment of said conventional coaxial cable.

5. Apparatus according to claim 1 wherein said condenser microphone means includes a backplate and a case with the backplate made from a material having a lower thermal expansion coefficient than the material that the case is made from to decrease an undesirable increase in mirophone sensitivity at high temperatures.

6. Apparatus according to claim 1 including a zero drive amplifier having an extremely low input impedance and a cable having a length of less than 0.3 m connecting said electrical current that is proportional to the sound pressure at the microphone means to the input of said zero drive amplifier.

7. Apparatus according to claim 6 wherein said feedback means includes a closed loop reference voltage, and means for obtaining the difference between said closed loop reference voltage and a voltage proportional to said electric current proportional and for applying the difference voltage to said voltage controlled oscillator to control its output frequency.

8. Apparatus according to claim 7 including means for disconnecting said difference voltage from said voltage controlled oscillator and for applying a calibration voltage to the oscillator.

* * * * *